US008478987B2

(12) United States Patent
Karl et al.

(10) Patent No.: US 8,478,987 B2
(45) Date of Patent: Jul. 2, 2013

(54) WIRELESS ACTIVATION OF IP DEVICES

(76) Inventors: Thomas F. Karl, Lindenhurst, NY (US); Jose Colucciello, Melbourne Beach, FL (US)

( * ) Notice: Subject to any disclaimer, the term of this patent is extended or adjusted under 35 U.S.C. 154(b) by 59 days.

(21) Appl. No.: 13/046,776

(22) Filed: Mar. 14, 2011

(65) Prior Publication Data

US 2012/0239923 A1    Sep. 20, 2012

(51) Int. Cl.
*H04L 29/06* (2006.01)
*H04N 7/18* (2006.01)

(52) U.S. Cl.
USPC .......................................... 713/153; 348/143

(58) Field of Classification Search
None
See application file for complete search history.

(56) References Cited

U.S. PATENT DOCUMENTS

| | | | |
|---|---|---|---|
| 6,970,183 B1 * | 11/2005 | Monroe | 348/143 |
| 7,449,999 B2 * | 11/2008 | Hevia et al. | 340/531 |
| 7,944,470 B2 * | 5/2011 | Foster et al. | 348/143 |
| 8,010,631 B2 * | 8/2011 | Brailean et al. | 709/219 |
| 8,248,226 B2 * | 8/2012 | Friar | 340/506 |
| 2005/0164678 A1 * | 7/2005 | Rezvani et al. | 455/411 |
| 2006/0161960 A1 * | 7/2006 | Benoit | 725/105 |
| 2009/0322874 A1 * | 12/2009 | Knutson et al. | 348/143 |
| 2011/0128378 A1 * | 6/2011 | Raji | 348/143 |
| 2012/0188072 A1 * | 7/2012 | Dawes et al. | 340/514 |

* cited by examiner

*Primary Examiner* — Nathan Flynn
*Assistant Examiner* — Abdullah Almamun
(74) *Attorney, Agent, or Firm* — Oakwood Law Group, LLP; Jie Tan

(57) ABSTRACT

A method of activating a wireless IP device by providing access to an installer to a customer's personal router or modem/router combination and providing access to the installer to a wireless Access Point which is supplied by the installer where the Access Point has a first slot for a default SSID2 password for a first wireless IP device and a second slot for an SSID1 password for a second wireless IP device. Connecting a first wireless IP device while in its initial or default state to the first slot where the first device and the wireless Access Point have a common default SSID2 code and factory preprogrammed public key and where, as soon as the device is powered up, the IP device immediately begins communicating through the wireless access point and the customer's router or modem/router to the internet, checking into a control server.

10 Claims, 1 Drawing Sheet

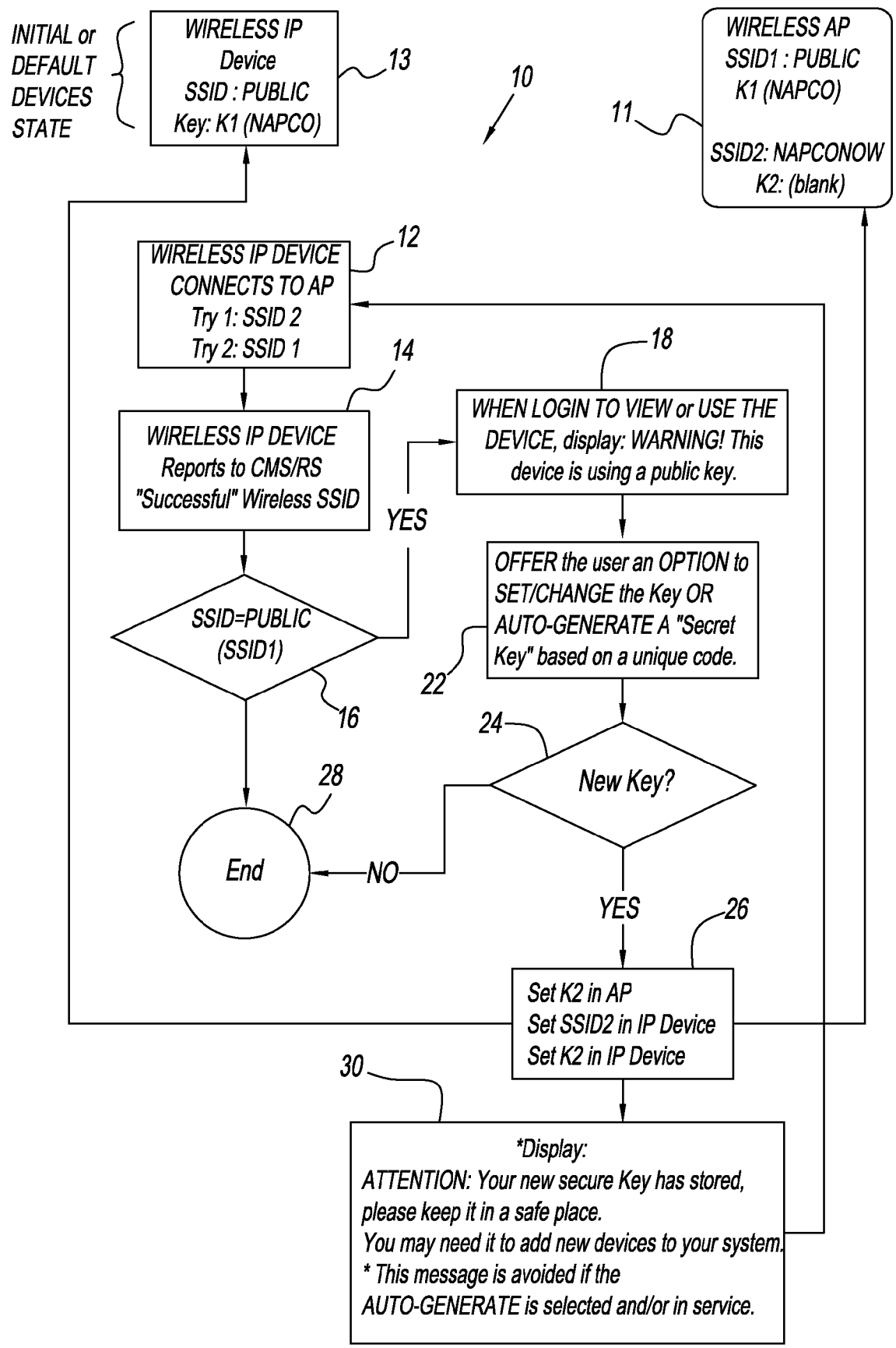

WIRELESS ACTIVATION OF IP DEVICES

BACKGROUND OF THE INVENTION

1. Field of the Invention

This invention relates generally to a method for connecting IP devices to an existing computer system network and more specifically to a wireless activation method for the IP devices. The invention provides a simplified method for configuring IP cameras, or other IP security devices to communicate through the local computer system network at the protected premise through the internet, while still providing a high level of data security, encrypting and protecting the data being transmitted through the internet.

This invention overcomes problems related to the current art, such as requiring a technical skill set that may not be present in all system installers. Current art also requires intrusive use of the customer's computer and/or router, which causes other privacy related concerns.

2. Description of Related Art

Remote video surveillance systems are being used in increasing numbers for various diverse purposes by communities, commercial establishments and home owners.

More specifically, commercial establishments and retail stores may use a live video surveillance system to watch suspicious elements on their premises and gather evidence against shoplifting and burglary, monitor customer traffic remotely to, for example, see the effectiveness of sales and to reduce labor costs, help employees and customers feel safer at night while, for example, walking through the parking lot or working alone, monitor critical deals remotely, or save time and travel expense retrieving and reviewing VHS surveillance tapes.

Home owners may use a live video surveillance system to monitor for intruders and help solve burglaries, monitor nannies, babysitters and caregivers, receive notifications when children get home and view a video to see who might be with them, monitor pets behavior, see who is at the door, monitor house or pool cleaning service, monitor second home or vacation home; and/or let friends and relatives look in on special occasions remotely.

A method for enrolling a wireless camera is known in the prior art. More specifically, by way of example, the method of enrolling wireless cameras as disclose by Xanboo WIFI-001USB Dongle Setup Guide, Page 2 provides the following instructions:

1. Press "Factory Reset" button on your camera to reset the camera. You will know the Camera has reset when the front LED's blink and the Camera goes through the pan/tilt cycle.
2. Using a PC on the same local network as your Controller, access your remote account through a web browser. Enter the User ID and Password you created when you purchased the system in the proper fields and log in to your remote account as shown below.
3. Once logged into your account, navigate to the "Account Settings", then "Discovery" and click "New Location" button . . . to register your Controller to your account.
4. The Controller registration Wizard will prompt you to download the plug-in needed to complete this process. When complete click on the "Continue With Device Discovery' link.
5. The discovery process should start automatically. If you don't see a message that Discovery is Initializing or In Progress, press the Start Discovery button to start the Discovery process. After the message changes to "Discovery In Progress . . . " your cameras will automatically discover to your controller.

As noted in the instructions, see underscoring, the installer is required to use a "PC on the same local network", typically the customer's personal computer, to perform "discovery" of the cameras and down load "plug-ins" in order to enroll a required gateway.

The customer's personal property should never be used as an installation tool, especially when the computer contains the customer's personal data including communications, pictures and banking.

The method of enrolling the wireless cameras as disclose by Honeywell IPCAM-WI 800-04431V1 11/09 Rev. A Installation Guide Page 1 Step 2 provides the following instructions:

Configuring Wireless Security:
When initially powered up, the camera and WAP use the same default AES key and encryption parameters. To create a new AES key, please perform the steps below,
1. Ensure an Ethernet cable is not connected to the camera, then plug the power Transformer into an outlet. Wait for the Power indicator to light solid.
2. Press and hold the WPS button on the router, or WAP Wireless access Point for 3 seconds, then RELEASE.
3. Within 1 minute, click and RELEASE the WPS button on the camera.
4. Allow up to 45 seconds for the WPS to complete, then verify successful wireless security as indicated by a STEADY GREEN Power LED and a Network LED that occasionally BLINKS GREEN. If these indicators are present you are done.
5. Repeat the steps above for each camera. The instruction page then shows a double column box titled "Unsuccessful Wireless Security Indications"

As noted in the instructions Honeywell requires complex installation procedures which involves confusing multiple steps with precision timing, see underscoring, as is required in steps 2, 3, and 4 for each camera.

The process must be repeated for each camera that is to be installed.

Honeywell also requires the use of the WPS function, which may place the customer's system in an unprotected mode where it is vulnerable to attacks.

The method of enrolling the wireless cameras as disclose by Alarm.com ADC-V510 Camera Installation Guide Page 1 provides the following instructions:

1. Use a standard Ethernet cable (not included) to connect the camera to the network router. Then connect the camera's AC adapter and plug it into a non-switched outlet. See illustration.
2. From a PC connected to the same network, log into the customer's Alarm.com account using internet Explorer.
3. After logging in, type www.alarm.com/addcamera into the browser's address bar.
4. If prompted by the browser, download the ActivaX control. (Note that some corporate PCs allow only administrators to download ActivveX controls)
5. Once the camera has been detected, select it from the list of available cameras and follow the on-screen instructions to add it to the Alarm.com account.
6. If the camera will be connected wirelessly to the network. To configure the camera's wireless settings when setup is complete, click on the Configure wireless network settings for this camera link and follow the on-screen instructions.
If the camera will be connected to a wireless network, you will need:

The case-sensitive SSID (wireless network name).
The network WEP or WPA key (if encryption is enabled at the router).
In addition to the above items, you may also need:
The network router's login and password, if Universal Plug and Play (UPnP) is described at the router.
A spare Ethernet cable, if the PC you are using for setup is not already connected to the network and is not able to be connected wirelessly.

Others also require the installer to use the customer's computer AND enter their wireless router, see underscoring, setup and read out the WEP or WPA security codes to be manually programmed into the cameras.

This method has both liability and privacy concerns.

SUMMARY OF THE INVENTION

In an exemplary embodiment of the present invention, there is disclosed a method of activating a wireless IP device which comprises:
providing access to an installer to a customer's personal router or modem/router combination;
providing access to the installer to a wireless Access Point which is supplied by the installer wherein the Access Point has a first slot for a default SSID2 password for a first wireless IP device and a second slot for an SSID1 password for a second wireless IP device; and
connecting a first wireless IP device while in its initial or default state to the first slot;
wherein the first device and the wireless Access Point have a common default SSID2 code and factory preprogrammed public key;
wherein as soon as the device is powered up the IP device immediately begins communicating through the wireless access point and the customer's router or modem/router to the internet, checking into a control server.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 1 is a flow diagram of the wireless activation for IP devices in accordance with the principles of the invention.

DESCRIPTION OF THE PREFERRED EMBODIMENT

As noted above in the paragraph entitled "Description of the Related Art", prior art wireless activation of IP devices normally require the invasive use of the customer's personal wireless router, which must be accessed by the installer, used as an installation tool by the installer, and then used as part of the system, receiving the wireless signals from the wireless devices.

More specifically the installer must enter the setup page of the customer's wireless router and read out the system's SSID code and the "private" key. By doing this, the customer's private network has been compromised; the alarm company employees have knowledge that would allow them to listen to the wireless network.

The installer must plug each wireless device into a hard (Ethernet) port on the customer's wireless router and connect to a web site to program that SSID code and "private" key into the device.

The installer must unplug the device from the router and then install it so it can communicate with the internet wirelessly through the wireless router.

This procedure must be repeated for each device to be registered.

Referring to FIG. 1, there is disclosed a flow diagram 10 of wireless activation for IP devices in accordance with the principles of the invention which avoids the various disadvantages of the prior art noted above. At the start the installer has plugged into customer's personal router a wireless Access Point (AP), which is a component of the system provided by the installing company where, when the AP is supplied by NAPCO, the assignee of this invention, the AP has a slot for default SSID password programmed (K1) for a NAPCO device, another slot for an SSID1 password programmed PUBLIC, a slot for an SSID2 password programmed NAPCONOW, and a slot for default SSID2 password for program K2 which is blank, block 11. The initial or default state of the wireless IP device is programmed either for an SSID password if PUBLIC or programmed K1 when a NAPCO device, block 13.

The installer connects the wireless IP device to an AP in the existing customer's router or modem/router combination, block 12. The wireless IP device is connected to the slot for the SSID 2 when the device is a NAPCO device and to the SSID1 when the device is public. The AP has a default SSID password programmed (K1) and a slot for an additional SSID password to be programmed (K2). The installer then installs the devices that communicate to the internet wirelessly. The device(s) and the wireless access point have a common default SSID code and factory preprogrammed public key. This allows the system to immediately begin to operate as soon as the connection is made to the AP and the devices are powered up. At this time, even though the system is encrypted, the system is not secure.

The IP device immediately begins communicating through the wireless access point and the customer's router to the internet, checking into the Control server, block 14. When the password is SSID2 (NAPCO device), activation is completed, block 28. When the password is SSID1 (public) the program advances to block 18 where, when the User accesses the device on the web page from an internet browser the server realizes that the system is operating with the default SSID code. Upon realizing this, the server notifies the User that the system is using a public key and is not secure, and the server immediately opens a "Warning Message", that allows the user to enter a unique private key, a password, for his system or optionally automatically AUTO-GENERATE, a key based on a UNIQUE code algorithm in the Wireless AP, block 22. If a new key is not entered, NO, block 24, The program advances to block 28 and ends. If a new key is entered, YES, block 24, the server then automatically programs that private key into the wireless gateway and the IP Device and the network is now secure, block 26. At this time, block 30, the server displays the following message: ATTENTION—Your new secure Key has been stored, please keep it in a safe place, or optionally, displays an icon, such as a "locked" symbol, on the web page indicating to the user that the system is now secure. You may need it to add new devices to your system. This message is not displayed if the AUTO-GENERATE is selected and/or in service. Steps 12 through 30 will be repeated to allow the new network to again become secure.

Although the new custom private key is programmed into the wireless access point, the original "default" wireless key remains active.

If a new IP device must be added to the system, it can be added using the method described above. Since the default key remains in the AP and the default wireless key of a new device which is to be added to the system will always match, the new device will be allowed to communicate to the internet.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A method of activating a wireless IP device comprises:
   providing access to an installer to a customer's personal router or modem/router combination;
   providing access to the installer to a wireless Access Point which is supplied by the installer wherein the Access Point has a first slot for a default SSID2 password for a first wireless IP device and a second slot for an SSID1 password for a second wireless IP device; and
   connecting a first wireless IP device while in its initial or default state to the first slot;
   wherein the first device and the wireless Access Point have a common default SSID2 code and factory preprogrammed public key;
   wherein as soon as the device is powered up the IP device immediately begins communicating through the wireless access point and the customer's router or modem/router to the internet, checking into a control server,
   wherein the first wireless IP device is a NAPCO device that is an IP security device;
   wherein the second wireless device is a PUBLIC device that is un-secured IP device accessible by a community;
   wherein a PUBLIC device while in its initial or default state is connected to the second slot;
   wherein the Public device and the wireless Access Point have a common default SSID1 code and factory preprogrammed public key;
   wherein as soon as the device is powered up the IP device immediately begins communicating through the wireless access point and the customer's router or modem/router to the internet, checking into a control server;
   wherein when the user accesses the device on the web page from an internet browser the server realizes that the system is operating with a default SSID code and notifies the user that the system is using a public key and is not secure.

2. The method of claim 1 wherein the Access Point has a default SSID password programmed K1.

3. The method of claim 2 wherein the SSID password programmed K1 is for a NAPCO device.

4. The method of claim 1 wherein the Access Point has an SSID password K2 which is to be programmed.

5. The method of claim 1 wherein upon notifying the user that the system is using a public key and is not secure, the server opens a warning message that allows the user to enter a unique private key, a password, for his system or optionally automatically AUTO-GENERATE, a key based on a unique code algorithm in the wireless AP or in the IP device.

6. The method of claim 5 wherein the method ends when a new key is not entered.

7. The method of claim 5 wherein, when a new key is entered, the server automatically programs the new private key into the wireless gateway and the IP device and the network is now secure.

8. The method of claim 7 wherein, after the new key is entered, the server displays a message about the new key.

9. The method of claim 8 wherein, after the new key is entered, the server displays a message or icon indicating that the new secure key has been stored.

10. The method of claim 9 wherein the warning message or icon indicating is not displayed if the AUTO-GENERATE is selected or in service.

* * * * *